United States Patent [19]
Bruzzone et al.

[11] Patent Number: 5,374,408
[45] Date of Patent: Dec. 20, 1994

[54] PROCESS FOR THE PREPARATION OF ALKALINE CHROMATES FROM CHROMIUM MINERALS

[75] Inventors: Giuseppe Bruzzone, Varazze; Diego Perrone, Cogoleto; Alfredo Parodi, San Donato Milanese, all of Italy

[73] Assignee: Luigi Stoppani S.P.A., Milan, Italy

[21] Appl. No.: 941,441

[22] PCT Filed: Apr. 29, 1991

[86] PCT No.: PCT/IT91/00034
§ 371 Date: Oct. 22, 1992
§ 102(e) Date: Oct. 22, 1992

[87] PCT Pub. No.: WO91/17118
PCT Pub. Date: Nov. 14, 1991

[30] Foreign Application Priority Data
May 9, 1990 [IT] Italy ............... 20242 A/90

[51] Int. Cl.$^5$ .............................................. C01G 37/14
[52] U.S. Cl. ......................................... 423/61; 423/596
[58] Field of Search ................... 423/61, 65, 68, 596

[56] References Cited
FOREIGN PATENT DOCUMENTS
2051 5/1925 Poland .
35772 3/1954 Poland .

Primary Examiner—Wayne Langel
Attorney, Agent, or Firm—Young & Thompson

[57] ABSTRACT

A process for the production of alkaline chromates by means of oxidative disaggregation in a reactor of substances containing trivalent chromium compounds in admixture with alkali. The oxidative disaggregation is carried out in dry phase by moving the mixture within the reactor while heating the mixture by indirect heat exchange in the absence of combustion gases and under mechanical stress, and feeding to the interior of the reactor oxidizing gas. The mixture is heated to a temperature of between 500° and 1500° C. The oxidizing gas is fed with an oxygen concentration in a range between 8 and 100%. Gases leaving the reactor are used for the acidification of an aqueous solution of alkaline chromates which is then dried and supplied to the reactor. The reactor is a rotating tubular reactor and the mixture moves continuously through the rotating reactor.

13 Claims, 3 Drawing Sheets

PROCESS FOR THE PREPARATION OF ALKALINE CHROMATES FROM CHROMIUM MINERALS

The present invention concerns the oxidative disaggregation of chromium minerals, that is to say the preparation of hexavalent chromium compounds by means of the oxidation of trivalent chromium compounds and, in particular, of minerals containing trivalent chromium.

The extraction of trivalent chromium from the natural minerals which contain it (minerals which will henceforth be referred to with the generic term "chromite") involves oxidizing trivalent chromium present in the minerals to hexavalent chromium and then extracting it, by means of subsequent leaching, in the form of hexavalent chromium soluble salts.

Conventional methods for the oxidative disaggregation of chromite involve finely grinding the mineral, which is then oxidized in the presence of sodium carbonates and/or sodium hydroxide or of other alkaline metals, at a temperature of between 600° and 1500° C.

In addition, thinning materials and sometimes oxidants are added to the mixture. Generally ferrous oxides and leaching residues are used as diluents.

The high temperatures necessary for the oxidation reaction are obtained by heating the mixture directly, that is to say by putting the mass to be disaggregated in direct contact with the flame and with the combustion products of the burner usually diluted in the atmospheric air necessary for oxidation.

Various working methods or compositions of the mix have been proposed with the aim of improving process yields.

For example, German patents Nos. DE-25 57 403 and DE-26 07 131 concern the disaggregation of chromite minerals lean in chromium but particularly rich in silica; German patent No. DE-25 42 054 proposes a multi-phase process which, in its preferential form, foresees three hot oxidation cycles (roasting), with the aim of raising the yields of the transformation of the $CR_2O_3$ of the chromite into hydrosoluble chromate to values to between 70 and 85%.

European patent No. EP-A-027 868 describes feeding furnaces with a mixture of minerals pelletized in an aqueous liquid, obtained in practice by the use of wet leaching residues.

The main disadvantage with all these known processes described above is the difficulty of obtaining a concentration of $O_2$ in the oxidizing gases which is sufficient for the complete oxidation of the trivalent chromium present in the mineral, since the oxygen present in the combustion fumes enriched with air is usually no more than about 8-10% of the total.

In addition, the fact that both the combustion and dilution gases are brought into direct contact with the mixtures leads to the entrainment of the particles from the furnace. These particles must be separated, with consequent and not indifferent ecological damages, since they contain hexavalent chromium also.

In order to improve the characteristics of the atmosphere inside the furnace, attempts have been made to increase the oxygen content of the oxidizing gases. For example, Japanese patent No. 75905 (Nippon K. K.), which describes the admission of an oxygen-rich gas under the flame of a directly heated rotating tubular furnace. Such a solution leads however to an increase in the entrained particles and in the formation of rings of fouling without any valuable yields improvements.

In an alternative process, known since the beginning of the century, (we cite for example, German patents No. DE-163814 and No. DE-171089), the oxidation reaction of chromium minerals is carried out at a relatively low temperature (400°-700° C.) by using low flux mixtures, generally obtained thanks to the presence of high quantities of alkaline hydroxides in the mixture. Oxidation is usually assisted either by injecting oxygen-containing gases into the melting bath or by the addition of oxygen donors (such as nitrogen acid alcohol salts, manganese oxides, lead oxides and the like) to the mixture.

A further problem arising from the known technique is due to the fact that the monochromate which forms during the reaction melts at the roasting temperature of the mineral.

It has been found that the melted monochromate initially is dispersed in the material present in the reactor, and is "absorbed" by it. When a certain weight percentage of monochromate ($Na_2CrO_4$) of the total weight of material loaded into the reactor is surpassed the gangue of the chromite can no longer "absorb" and retain the melted monochromate, which comes into contact with the reactor, forming rings of fouling (in the case of tubular furnaces), with all the accompanying disadvantages.

The chromite mineral usually contains a quantity of chromium oxides such as will give a weight of monochromate greater than the maximum percentage "absorbable", which for the known processes in dry phase is not usually higher than 40%.

This fact has caused various attempts to find different types of solutions so as to be able to work with economically acceptable conversion yields of chromium and alkaline compounds.

A first solution, which is the one most widely adopted, consists in adding to the mixture to be subjected to oxidative disaggregation one or more "thinning" materials with no or a very low chromium content, which can thus retain or "absorb" the melted monochromate.

For this purpose, use is often made of the resultant earths from a previous oxidative disaggregation.

This solution has the disadvantage of having to treat each time a mass of material much larger than the ideal one, which consists of only minerals and alkali.

A second solution is described in the U.S. Pat. No. 3,963,824. In this technique the ground chromite mineral is dispersed in a bath of low flux alkaline salts and indirectly heated in a reactor, under agitation and with the injection of oxygen. The main disadvantage of this technique consists in the excessive consumption of alkaline salts, which must be present in a ratio to the mineral varying between 5:1 and 20:1, which makes this technique substantially unsuitable for application to industrial processes because of the high costs it involves.

According to a further technique, described in patent US-3,295,954 a "binary" mixture, that is to say of only chromite minerals and alkali, is subjected to oxidative disaggregation while the mixture is at rest. For this purpose the mixture is prepared in cakes, which are placed in special containers and dragged through an indirectly heated furnace, inside of which an atmospheric air current flows. In this way it is possible to avoid the escape of melted monochromate from the mineral, even in the absence of thinning materials, thus obtaining a transformation yield of the chromium present in the mineral of about 90%.

The disadvantage of this technique lies in the fact that it requires the mixture to be in a state of absolute rest during oxidation. Continuous reactors such as rotary furnaces are explicitly excluded from this technique, as they would give rise to the above-mentioned phenomena of the formation of foulings and rings. Therefore it is easy to see the uneconomical nature of this technique also, as well as its difficult practical realization.

The present invention aims at a process which allows the oxidative disaggregation of materials containing trivalent chromium compounds, under controlled conditions, with high yields and without the formation of foulings and rings.

A second aim of the invention is to carry out such oxidative disaggregation by means of a process which allows the chromium compounds contained in the said minerals containing trivalent chromium to be converted in a short time.

A third aim of the invention is to be able to disperse the combustion gases directly into the outside atmosphere without the need for plants for purifying fumes from the chromium residues.

All of these aims have been achieved by means of the present invention, which teaches a process for the production of alkaline chromates by means of oxidative disaggregation of minerals and/or substances containing trivalent chromium compounds in the presence of alkali, characterized in that said oxidative disaggregation is carried out in dry phase by heating said material in a controlled environment and with a pre-established oxygen percentage adjustable according to the desired dwell time of the material in said reactor.

By means of this process a significant increase in the transformation yield is obtained and there is a surprising increase in the kinetics of the reaction, with a consequent reduction in firing time and great benefits in terms of furnace productivity.

BRIEF DESCRIPTION OF DRAWINGS

The invention will now be described, in greater detail, with reference to the appended drawings which are to be considered in a purely illustrative and no limitative way, in which.

Figure 1:
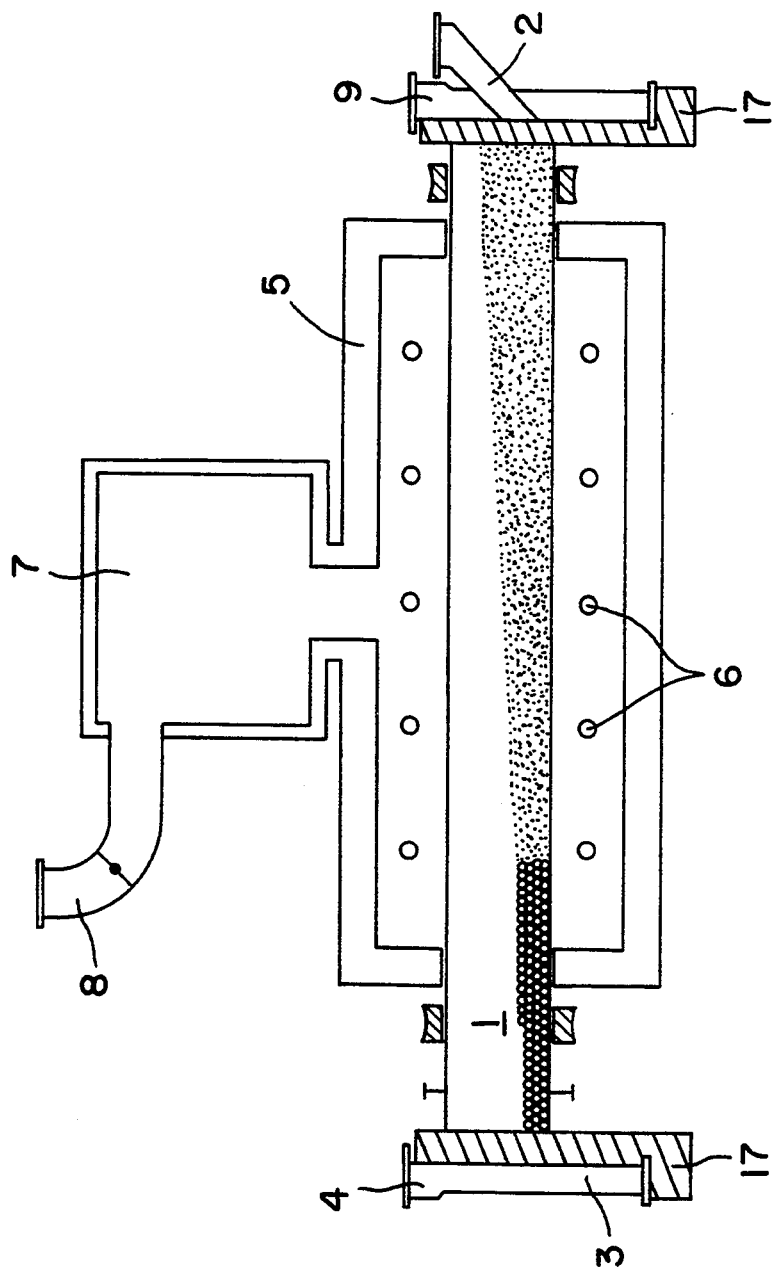
FIG. 1 shows a longitudinal sectional view of a preferred embodiment of a plant for practicing a method according to the invention.

The process according to the invention involves oxidative disaggregation, that is to say that the material containing trivalent chromium compounds is initially ground to a pre-established granulometry and then mixed (preferably in dry phase) with alkali and, if necessary, with thinning materials, which have also been ground to the desired granulometry.

The mixture thus obtained can be pre-heated according to known techniques (for example, by the use of the hot gases from the plant), and then fed into a reactor where the oxidation of the mineral, leading to the formation of alkaline chromates, takes place.

According to the principles of the invention, the heating means are distinct from the means used for feeding the oxidation gases, and the oxygen needed for this reaction is supplied by feeding the gases containing different, pre-established and adjustable concentrations of oxygen, in a controlled way, to the mixture. In other words, unlike known processes, the oxidation phase takes place in a controlled environment in the absence of combustion products of burners, which in traditional processes supply the system with both the heat and the oxygen necessary for the reaction. Thus, the reaction is carried out in dry phase by heating and moving the mixture within the reactor in the absence of combustion gases and under mechanical stress.

At the end of the oxidation reaction the "frit" obtained is leached in the know manner in order to extract as aqueous solutions the alkaline chromates; object of the present invention.

The heating of the mixture as above described allows the verifying of the composition of the oxidizing gases fed to it by adjusting the concentrations of $O_2$ in relation to the composition of the mixture, the reaction temperature and the kinetics desired introducing gases with oxygen concentrations ranging from 8% to 100%.

In addition to the adjustment of the oxygen concentration the reaction can be controlled by adding oxidizing compounds to the mixture.

Furthermore, the process according to the invention, as will be clearly seen from the examples cited below, has proved to be particularly advantageous in the case where the reactor is fed with gases containing a volume of oxygen superior to that contained in air (about 21%), and particularly when the reactor is fed with substantially pure and heated oxygen.

The heating of the mixture in a controlled environment keeps the combustion products from the burners separate from the oxidizing gases and thus avoids entrainment of the particles in the gases originating from the heating of the reactor. Consequently, the expensive separation and purification plants indispensable to traditional processes are no longer necessary.

The leaving combustion products free from particles, in particular from chromium, can be therefore directly sent to exchanging means for recovering the heat and then directly to the atmosphere.

The gases resulting from the oxydation reaction in the case in which alkalis present in the mixture include carbonates and/or bicarbonates contain carbon dioxide generated from the decomposition of said carbonates/bicarbonates.

A concentration of $CO_2$ even higher than 90% can be obtained in the gases leaving the reactor by opportunely regulating the flow rate and the composition of the oxidizing gases.

This result has been achieved by using suitable means which prevent the gas dilution inside the rector.

The carbon dioxide thus obtained, after being appropriately washed and cooled, can be advantageously directed to the acidification process to provide carbonation of the aqueous solution of alkaline chromates obtained by leaching the oxidized mixture.

At this point it should be noted that the present invention can therefore allow reactor outlet gases to be obtained with a high enough concentration of carbon dioxide to allow them to be fed directly to the means of carbonation of the chromate solution, without having first to concentrate the carbon dioxide.

Furthermore, the volume of carbon dioxide obtained is such that it is entirely sufficient for the needs of the process of transformation of the chromate into alkaline dichromate for carbonation. The reactor generates high concentrations of carbon dioxide and thus obviates the need for special carbon dioxide production plants.

Another particularly advantageous aspect of the process according to the invention is the fact that the gases from the reactor outlet are analyzed, thus making it possible to adjust the conditions of reaction and maximize the production cycle.

In addition, by appropriate adjustment of the oxidation gases, this invention allows more or less complete conversion of alkali into alkaline monochromates (see FIG. 3), and this is reflected by the nature of the compounds resulting from the working of the chromite.

In fact, contrary to what happens during the known processes of oxidative disaggregation in the absence of calcium compounds (or when the quantity of such compounds in the mixture is limited), the resultant earths obtained after leaching surprisingly do not have magnetic characteristics.

This means that the chemistry of the firing and oxidation phases differs substantially from what is so far known, insofar as the present invention makes possible the complete transformation of the carbonate into chromate.

This particular result also makes it possible to control the extent of the use of alkali in the process of firing the mixture, in relation to the presence or absence of magnetic characteristics in the resultant earths.

On this subject, it must be stressed that obtaining resultant earths with magnetic characteristics indicates that the described transformation has not been completed, possibly improving plant capacity.

A series of preliminary tests will now be described, which were carried out in a laboratory muffle furnace. Their results form an important basis for finding new and important characteristics of the process, and consequently of the plant according to the invention.

The chromium mineral mentioned in the following examples is a chromite with the following composition: $Cr_2O_3$ 46.2%, FeO 27.1%, $Al_2O_3$ 15.9%, MgO 9.7%, $SiO_2$ 1.0%.

EXAMPLE 1

A mixture, made up of 100 parts of chromium mineral, 66 parts of sodium carbonate and 120 parts of dried leaching residues derived from previous disaggregations, is roasted at 1050° C. for 30 minutes in a laboratory muffle furnace.

Numerous tests are made, changing the oxygen content of the gaseous mixture present in the furnace.

The yields in terms of the transformation of the chromium present in the mineral into sodium chromate, that can be leached from the reaction mixture vary as follows:

| $O_2$ % Vol. | yield |
| --- | --- |
| 4 | 52% |
| 8 | 70% |
| 10 | 78% |
| 21 | 83% |
| 100 | 95% |

EXAMPLE 2

A mixture, made up of 100 parts of chromium mineral, 66 parts of sodium carbonate, 31.5 parts of lime and 88.5 parts of dried leaching residues derived from previous disaggregations, is roasted at 1050° C. for 30 minutes in a laboratory muffle furnace.

Tests are made, changing the oxygen content of the gaseous mixture present in the furnace.

The yields in terms of the transformation of the chromium present in the mineral into sodium chromate that can be leached from the reaction mixture vary as follows:

| $O_2$ % Vol. | yield |
| --- | --- |
| 7 | 82% |
| 10.5 | 87% |
| 21 | 90% |

EXAMPLE 3

A mixture, made up of 100 parts of chromium mineral and 48 parts of sodium carbonate, is roasted at 780° C. for 3 hours in a laboratory muffle furnace.

Two tests are made: the first in the air and the second in pure oxygen.

The yield in terms of the transformation of sodium carbonate into chromate passes from 71.9 to more than 99%.

EXAMPLE 4

A mixture made up of 100 parts of chromium mineral, 54 parts of sodium carbonate and 46 parts of dried leaching residues derived from previous disaggregations, is roasted at 960° C. for 10 minutes in a laboratory muffle furnace.

Two tests are made: the first in the air and the second in pure oxygen.

The yield in terms of the transformation of sodium carbonate into chromate passes from 88.2 to more than 99%.

EXAMPLE 5

A mixture, made up of 100 parts of chromium mineral and 33 parts of sodium carbonate, is roasted at 900° C. for 10 minutes in a laboratory muffle furnace.

Two tests are made: the first in the air and the second in pure oxygen.

The yield in terms of the transformation of sodium carbonate into chromate passes from 88.7 to more than 99%.

EXAMPLE 6

A mixture, made up of 100 parts of chromium mineral and 43 parts of sodium carbonate, is roasted in pure oxygen at 950° C. for 10 minutes in a laboratory muffle furnace.

Under such conditions, the yield in terms of the transformation of sodium carbonate into chromate is more than 99%.

The frit is leached and 100 parts of the dried residue are mixed with 30 parts of sodium carbonate and once again roasted in oxygen, this time at 1050° C. for 1 hour.

Under these conditions, the yield in terms of the transformation of the $Cr_2O_3$ present in the mineral into sodium chromate rises to more than 95%.

The final residue contains just 3.7% of $Cr_2O_3$.

The data arising from the above-mentioned examples show how an increase in the transformation of chromium itself corresponds to the increase in the concentration of oxygen in the environment in which the transformation reaction of chromium takes place. These yields reach almost 100% in the case where pure oxygen is present in the reaction chamber.

The invention will now be further described by means of the following examples, which are to be considered purely as examples of the present invention and in no way restrictive.

EXAMPLE 7

A mixture, made up of 100 parts of chromium mineral, 52.5 parts of sodium carbonate and 15 parts of dried leaching residues derived from previous disaggregations, is continuously sent to a pilot roasting plant. The said plant consists of an externally heated unfettled rotating tubular reactor in special alloy, having the following dimensions: diameter—250 mm; heated length—3000 mm. The mixture is fed at a rate of 7.5 kg/hour and the internal temperature of the reactor is maintained at 980° C. With a countercurrent air flow, the yield in terms of the conversion of sodium carbonate into sodium chromate is just over 96%.

EXAMPLE 8

A mixture, made up of 100 parts of chromium mineral, 52.5 parts o sodium carbonate and 15 parts of dried leaching residues derived from previous disaggregations, is continuously sent to the plant described in the above example. Maintaining the internal temperature of the reactor at 980° C., but sending in a countercurrent flow of pure oxygen, a feed rate of 28 kg/hour gives yields in terms of the conversion of sodium carbonate into sodium chromate of more than 98%. The residues obtained after leaching the reaction product do not have any magnetic characteristics. The gas at the reactor outlet has the following indicative dry composition: $CO_2$ 88%, $O_2$ 11%, $N_2$ 1%.

EXAMPLE 9

A mixture, made up of 100 parts of chromium mineral, 26.5 parts of sodium carbonate, 41 parts of sodium bicarbonate and 15 parts of dried leaching residues derived from previous disaggregations, is continuously sent to the plant described in Example 7, maintaining inside the reactor a temperature of 980° C., by sending a countercurrent pure oxygen flow, at the rate of 29.5 kg/hour, conversion yields of sodium carbonates into sodium chromate of more than 98% are obtained.

The residues of the reaction product obtained after leaching do not have any magnetic characteristics. The gas at the reactor outlet has the following indicative dry composition: $CO_2$ 90%; $O_2$ 9%; $N_2$ 1%.

EXAMPLE 10

A binary mixture, made up of 100 parts of chromium mineral and 57.3 parts of sodium carbonate is continuously sent to the plant described in Example 7. The mixture is fed at a rate of 28 kg/hour. The temperature inside the reactor is maintained at 990° C., and with a countercurrent flow of pure oxygen a yield is obtained in terms of the conversion of sodium carbonate into sodium chromate of more than 97%.

EXAMPLE 11

A binary mixture, made up of 100 parts of chromium mineral and 57.3 parts of sodium carbonate is continuously sent to the plant described in Example 7, in which the temperature inside the reactor is maintained at 990° C. With a countercurrent flow of pure oxygen, preheated to 800° C., a yield is obtained in terms of the conversion of sodium carbonate to sodium chromate of more than 97%, with stay times of the mixture being roasted of less than 10 minutes. Under such conditions, the conversion of the $Cr_2O_3$ originally present in the mineral into sodium monochromate is more than 85%.

Oxidation in a controlled oxygen content atmosphere gives, therefore, under the same working conditions, the desired transformation yield with stay times short enough (see FIG. 3) not to allow the melted part to separate from the "inert" part.

In other words, the control of the $O_2$ content of the oxidizing gases and of the other reaction parameters allows working with a very high reaction speed, enriching in a short time the gangue of the mineral with melted monochromate, and discharging it all as soon as the conversion has reached the desired percentage, before rings and foulings can form in the reactor.

As described in the Examples from 7 to 11 the preferred reactor is made of an indirect heating rotating furnace, provided with means for continuously moving the mixture during its flowing inside the tubular reactor. The oxidizing gases are preferably fed in countercurrent to the mixture flow through the reactor.

The special nature of the process according to the invention is visually apparent also in the product thus obtained.

It has in fact been observed that the mineral containing the monochromate which has undergone an oxidation process according to the invention comes out from the tubular reactor in the form of almost globular and, for the most part, porous particles.

This physical aspect of the roasted mineral is particularly advantageous inasmuch as it allows the particles to be sent to a quencher while still hot, without too much powder, and without the necessity for crushing them previously, therefore facilitating the leaching of the material itself.

The quenching also takes place in more uniform and less violent manner, with respect to the commonly used plants.

By the use of a binary mixture, as foreseen in the preferred embodiment of the process according to the invention, the weight ratio between monochromate content and the gangue or inert portion of the mineral is higher than the rate of 1:1, with obvious advantages for its subsequent treatment.

Figure 3:
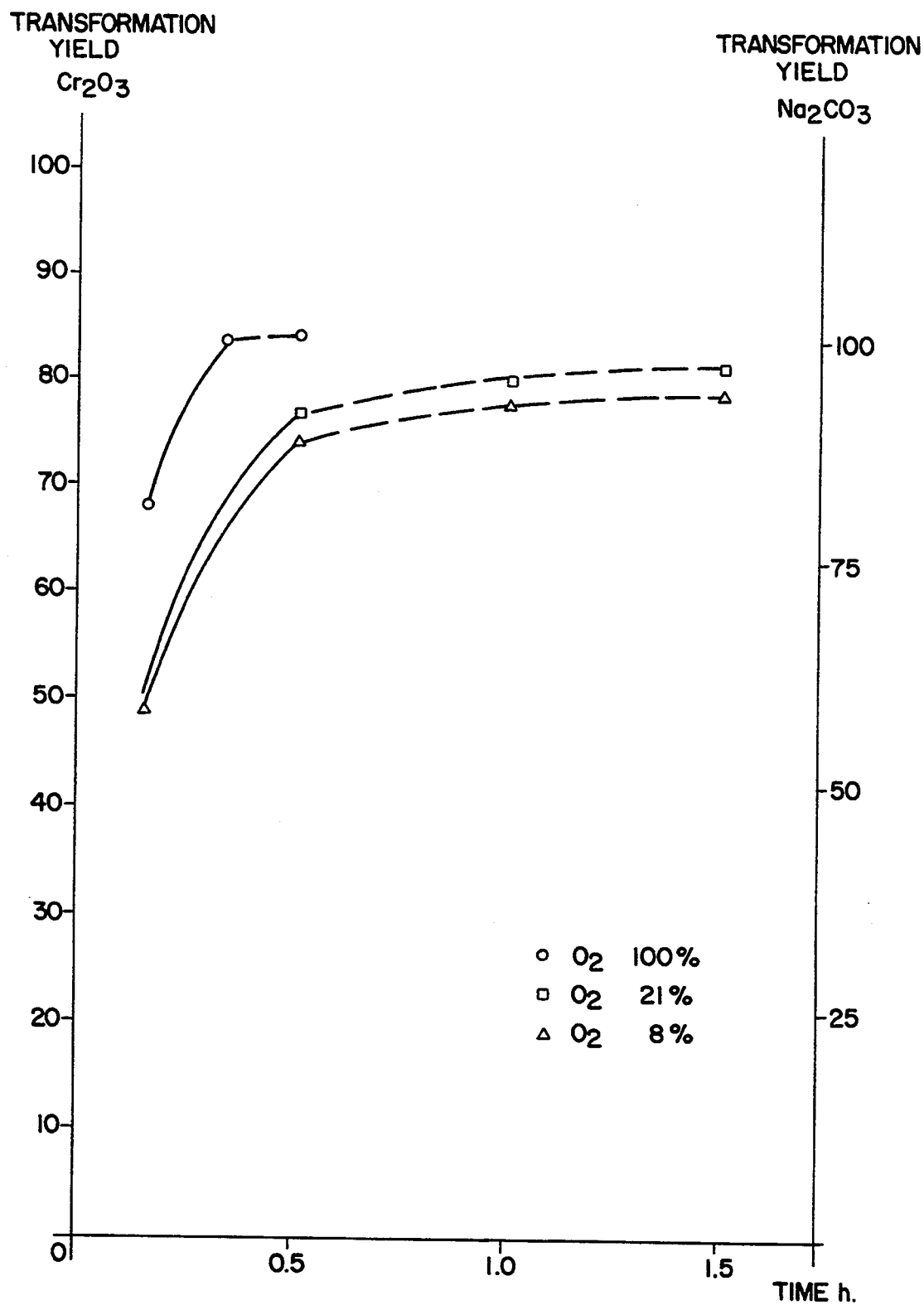
FIG. 3 shows a graph, on which are marked the transformation yields both of soda and of chromite in relation to the time for different concentrations of oxygen, using the process according to the invention.

From the graph shown in FIG. 3 it will be very clear how the process according to the invention gives marked increases in the yields of soda and of chromium mineral, and at the same time a reduction in firing times.

The data shown refer to an oxidation reaction carried out at a temperature of 1000° C. on a binary mixture.

With reference to FIG. 1, a diagrammatic description will now be given of a preferred plant for the realization of a process according to the present invention. As has already been mentioned, such plant has a rotating tubular reactor 1, provided upstream with means 2 for feeding the mixture, and with means 9 for feeding the outlet gases from the reactor to the heat exchanger and/or to the means for recovering carbon dioxide and/or for analyzing the gases (not shown). At its downstream extremity, it is provided with means 3 for conveying the oxidized mixture to the leaching means (not shown) and with means 4 for feeding oxidizing gases in countercurrent to the flow of the mixture; the plant also comprises sealing means 17 to prevent the gas dilution inside the reactor.

The reactor 1 is mounted inside the structure 5, generally in refractory material, which forms the heating chamber of the furnace. The heating chamber 5 is provided with means, shown schematically with reference number 6, for the heating of the tubular reactor 1. The heating means 6 are known means such as, for example, burners above and below the tubular reactor.

On the upper part of the heating chamber 5 means 7 are provided for discharging the combustion gases of the heating elements 6. These technically known means include valve means 8 for controlling the draft of the furnace 5.

It is evident that the plant according to the present invention allows the combustion gases from the heating elements 6 to be fed to the heat recovery means (not shown), as they are completely free from chromium particles, and that the refractory material of the heating chamber 5, being placed outside the reactor, is insulated from the mixture containing the chromium compounds, thus avoiding any contamination of the furnace by the latter and making maintenance operations easier.

Figure 2:
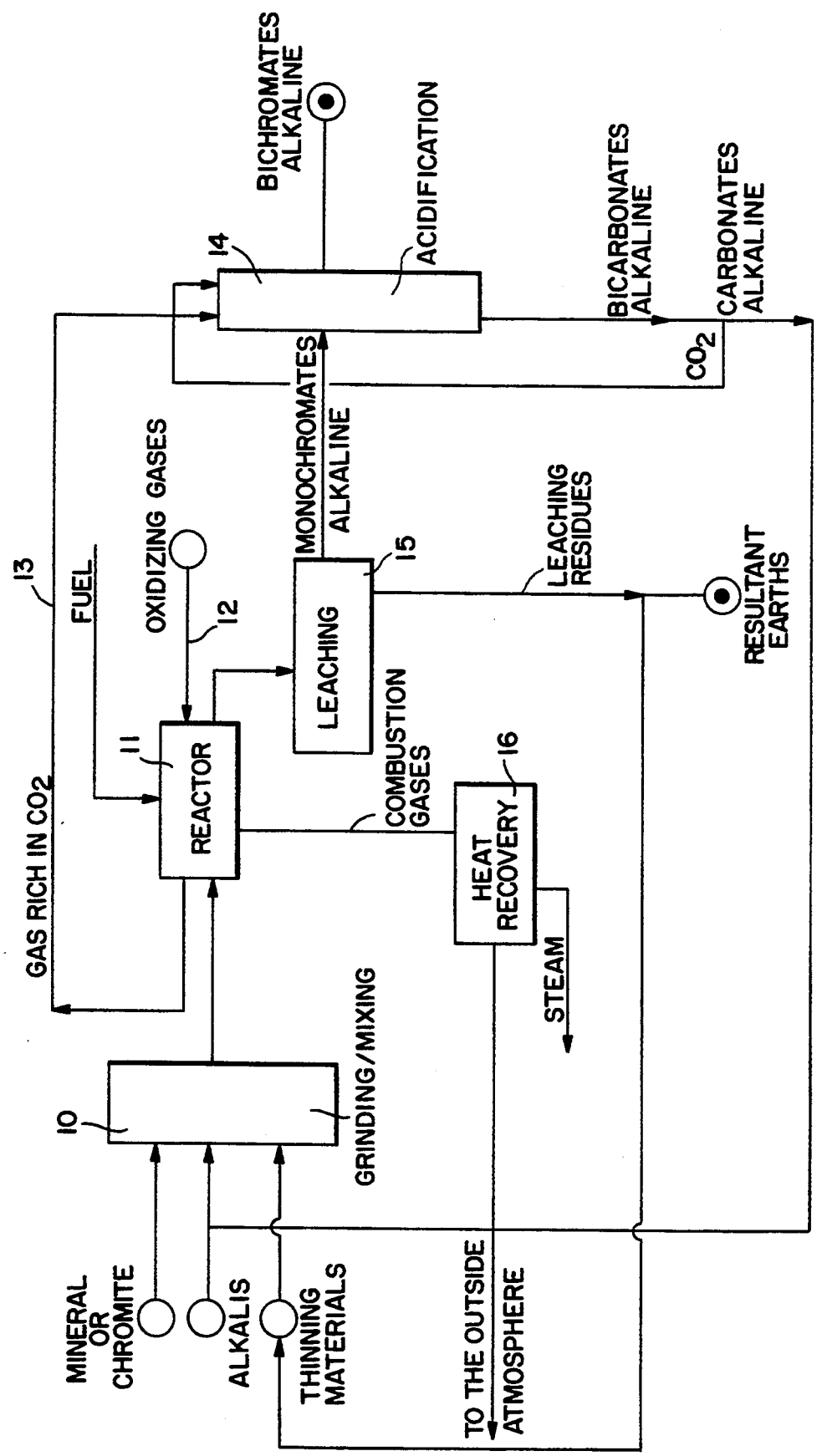
FIG. 2 shows a diagram illustrating the phases of the process according to the invention.

FIG. 2 is a schematic diagram showing a preferred embodiment of a plant for practicing a method according to the present invention, and the various working phases.

With reference to the said drawing, the chromite, the alkali and the thinning material, if any, are fed to the means 10 for grinding and/or mixing and subsequently to the tubular reactor 11, which is simultaneously heated by combustion gases according to the method described above. The mixture is thus set in direct contact with the inner walls of the tubular reactor 11, which acts as a means for transmitting heat and which, unlike traditional furnaces, does not have a layer of refractory material on its inner walls.

The oxidizing gases are fed into the reactor 11 along the line 12, in a direction which is countercurrent to the flow of the mixture: in this way the gases at the outlet of the reactor, rich in carbon dioxide (as described in the above examples), can be directly passed by the line 13 to the means 14 for the acidification of the solution of alkaline monochromate, which enters through the means 15 for leaching of the oxidized mixture.

The alkaline bicarbonate formed during the said acidification process may be advantageously recycled, after appropriate treatment, to the mixing means 10.

The diagram shows a heat exchanger 16 which can be used to recover heat from the gases of the reactor's heating burners. As shown, the gases coming from the exchanger are directly discharged into the outside atmosphere, as they are free from chromium.

As already underlined, the particular embodiment of the plant just described must not be considered as limitative of the invention itself, the fundamental idea of the invention being able to take concrete form in quite different embodiments also:

For example, it is possible to think of an embodiment in which the heating of the oxidative reactor takes place inside the same by means of electrical resistances of the known type. In this case also the oxidation of the trivalent chromium takes place in a controlled environment with the oxidizing gases, which are capable of interacting entirely with the mineral to be oxidized.

We claim:

1. A process for the production of alkaline chromates by means of oxidative disaggregation in a reactor of substances containing trivalent chromium compounds in admixture with alkali, comprising carrying out said oxidative disaggregation in dry phase by moving said mixture within said reactor while heating said mixture by indirect heat exchange in the absence of combustion gases and under mechanical stress, and feeding to the interior of said reactor oxidizing gas with an oxygen concentration comprised in a range between 8 and 100%.

2. A process according to claim 1, wherein said mixture is heated to a temperature of between 500° and 1500° C.

3. A process according to claim 1, wherein the oxidizing gas is fed with an oxygen concentration greater than 21%.

4. A process according to claim 1, wherein pure air is fed as said oxidizing gas.

5. A process according to claim 1, wherein substantially pure oxygen is fed as said oxidizing gas.

6. A process according to claim 1, wherein oxidizing compounds are added to said mixture.

7. A process according to claim 1, wherein the alkali is selected from the class consisting of sodium carbonates, bicarbonates, sodium hydroxide and their mixtures.

8. A process according to claim 7, wherein gases leaving the reactor are used for the acidification of an aqueous solution of alkaline chromates.

9. A process according to claim 1, wherein said mixture is indirectly heated by means of burners.

10. A process according to claim 1, wherein at least one of said mixture and said oxidizing gas is preheated.

11. A process according to claim 1, wherein said reactor is a rotating tubular reactor and said mixture moves continuously through said rotating reactor.

12. A process according to claim 1, wherein said reactor has unfettled walls and said mixture is heated by heat applied to the exterior of said unfettled walls.

13. A process according to claim 1, wherein said mixture initially consists essentially of said trivalent chromium compounds and said alkali.

* * * * *